Feb. 12, 1952     O. B. VETTER     2,585,705

RING-BALANCE

Filed Aug. 14, 1946     5 Sheets-Sheet 1

Inventor:
Otto B. Vetter:
By Albert I. Kegan
Atty.

Feb. 12, 1952     O. B. VETTER     2,585,705
RING-BALANCE
Filed Aug. 14, 1946     5 Sheets-Sheet 2
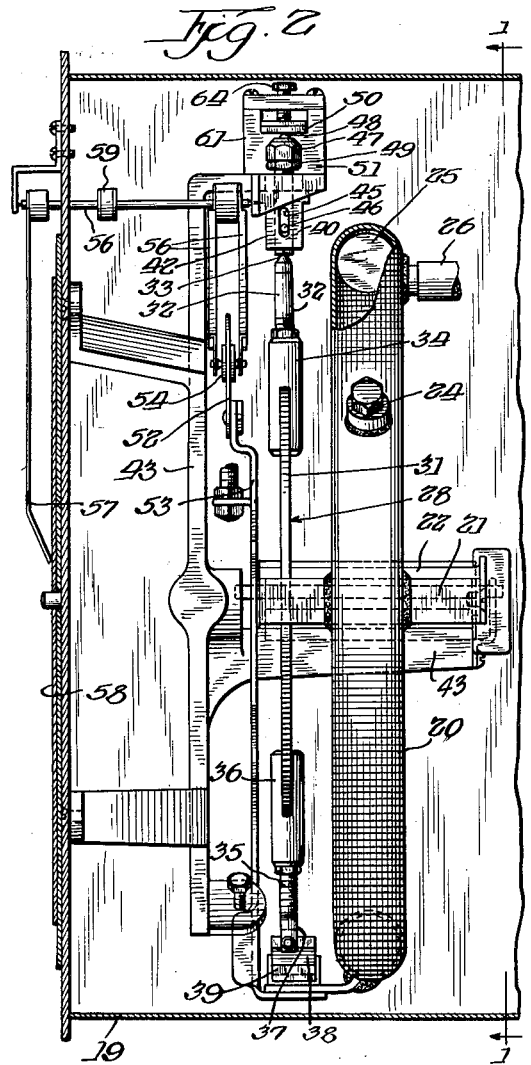
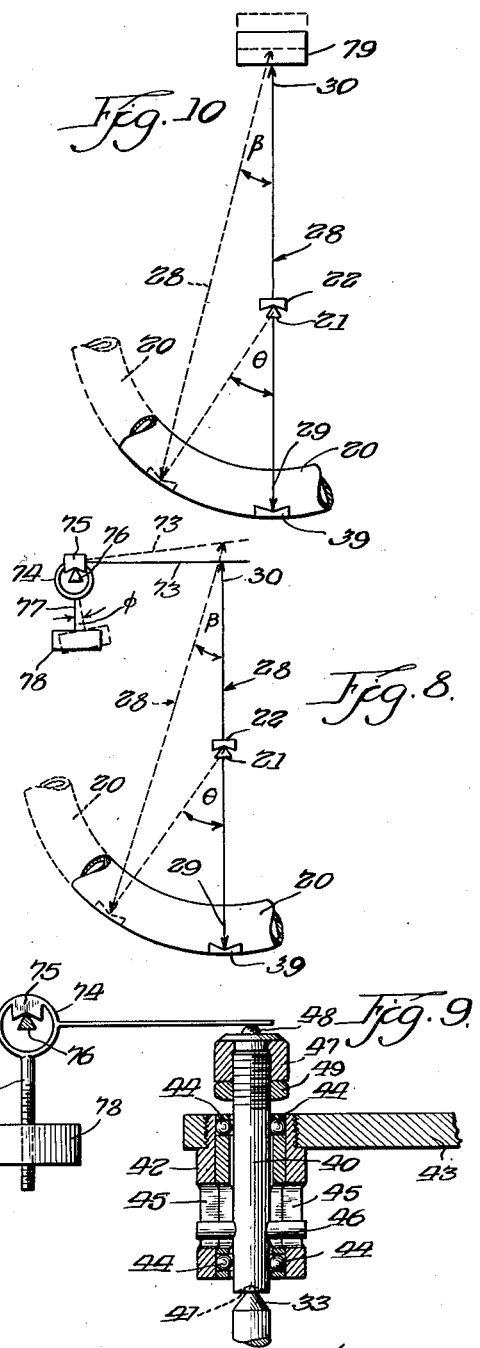
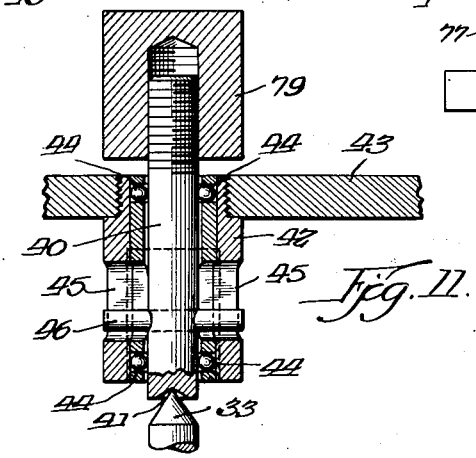
Inventor:
Otto B. Vetter
By Albert I. Kegan
Atty.

Feb. 12, 1952 — O. B. VETTER — 2,585,705
RING-BALANCE
Filed Aug. 14, 1946 — 5 Sheets-Sheet 3
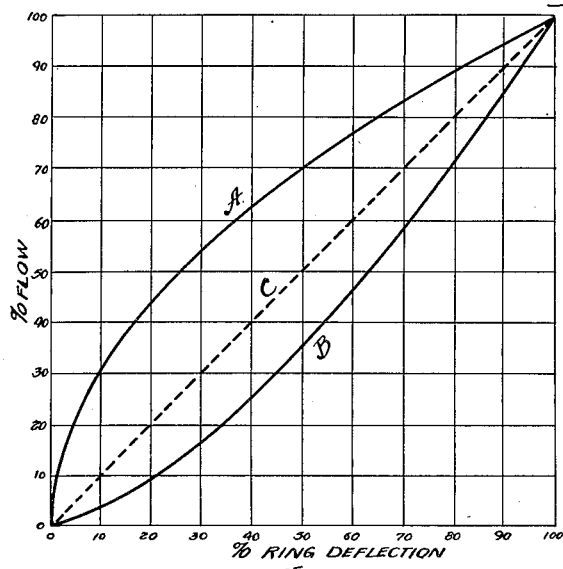
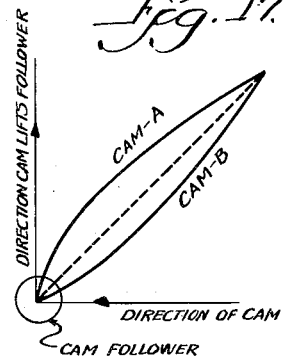
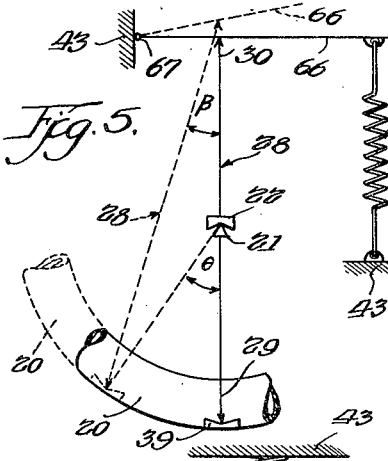
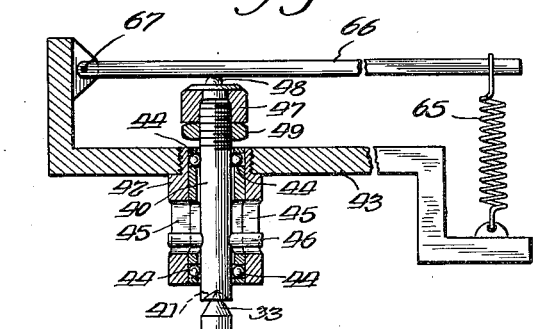
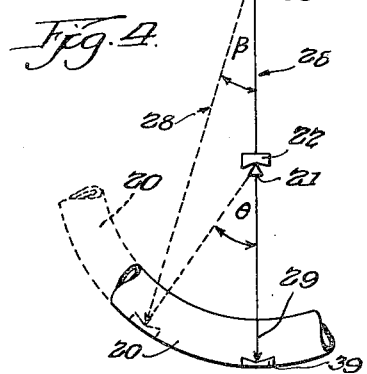
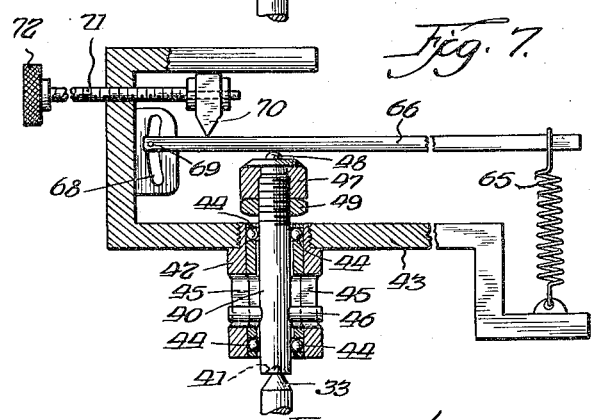
Inventor:
Otto B. Vetter
By Albert I. Kegan
Atty.

Feb. 12, 1952     O. B. VETTER     2,585,705
RING-BALANCE

Filed Aug. 14, 1946     5 Sheets-Sheet 4

Inventor:
Otto B. Vetter
By Albert I. Kegan Atty.

Feb. 12, 1952     O. B. VETTER     2,585,705
RING-BALANCE
Filed Aug. 14, 1946     5 Sheets-Sheet 5
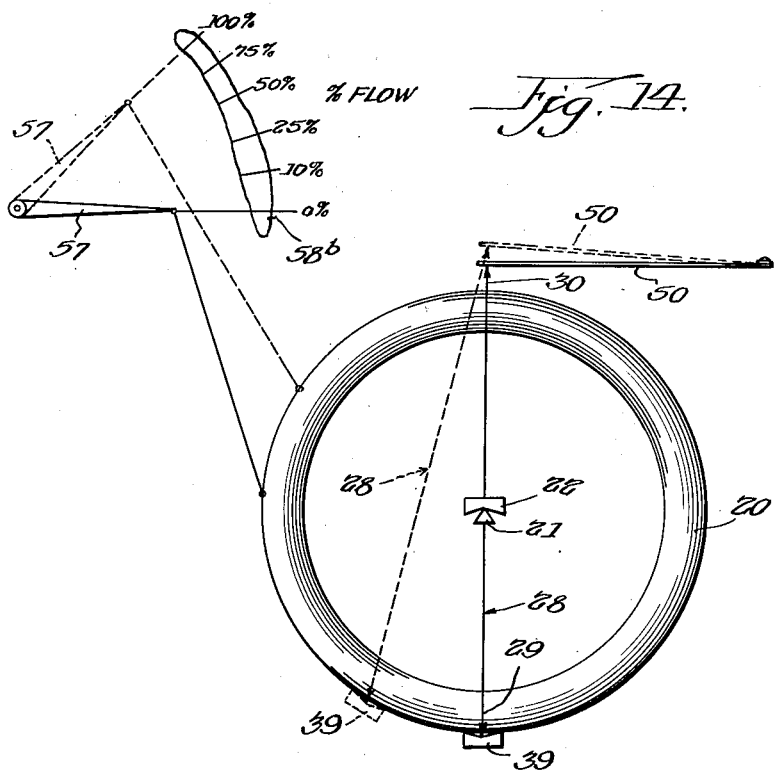
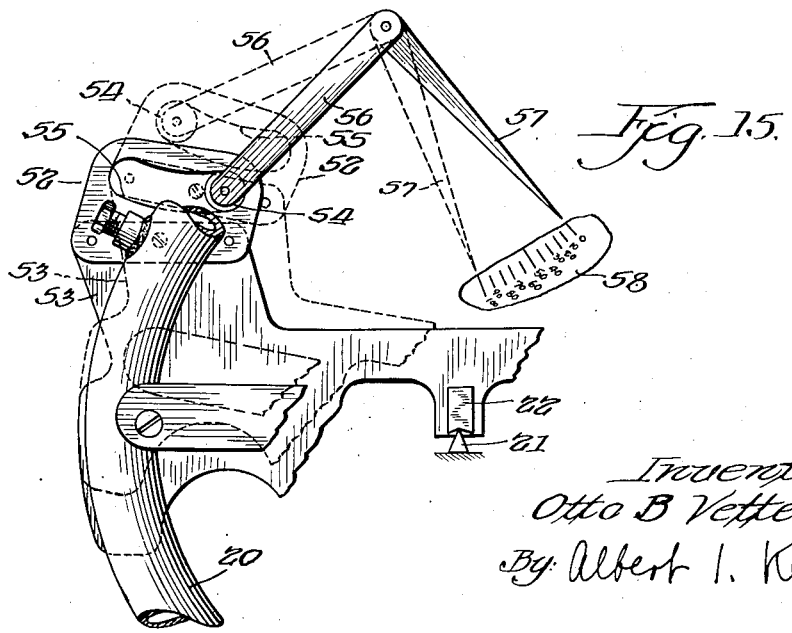
Inventor:
Otto B Vetter:
By Albert I. Kegan
Atty.

Patented Feb. 12, 1952

2,585,705

UNITED STATES PATENT OFFICE 2,585,705

RING-BALANCE

Otto B. Vetter, Chicago, Ill., assignor, by mesne assignments, to Hagan Corporation, Pittsburgh, Pa., a corporation of Pennsylvania Application August 14, 1946, Serial No. 690,390

24 Claims. (Cl. 73—405)

This invention relates to improvements in measuring apparatus.

The principal object of the present invention is to provide novel loading mechanisms for use with measuring apparatuses, whereby the relation between a force applied to a rotatable member responsive to variations in a variable under measurement and the corresponding deflection of the rotatable member may be controlled according to a preselected law. The versatility of my invention, and the control of the deflection of the rotatable member thereby achieved, leads to the elimination of serious disadvantages in the prior art devices and to an accuracy, an ease of operation and a scope of utility heretofore unobtainable in measuring apparatuses.

In its broad aspect, the present invention embraces the combination in a measuring device including a rotatable member responsive to variations in a variable undergoing measurement, of loading means acting at a point other than the center of rotation of said member, and mechanism interconnecting said member with said loading means to convert the curvi-linear translation of said member into a substantially rectilinear translation at the loading means. With this basic arrangement, angular displacement of the rotatable member causes a substantially linear movement of that portion of the mechanism operatively connected with the loading means and thereby establishes a loading force which is transmitted through the connecting mechanism to oppose further rotation. In one realization of the invention, said interconnecting mechanism takes the form of a rigid link compelled at one end to follow the rotation of the rotatable member and constrained at the other end to substantially linear motion, said other end communicating with said loading means. Further, the loading means in one form comprises a spring; while in another form it comprises a weight either directly acting upon the rigid link or else acting through a lever system.

By way of illustrating the application of my invention, the rotatable member may be a torus of a ring balance of the type described in my prior Patent No. 2,370,095, entitled "Multiple Ring Balance," issued February 20, 1945, to the Ring-Balance Instrument Company of Chicago, Illinois, as assignee. It is apparent from said description that in a ring-balance the deflection of the ring-body is a measure of the pressure differential imposed thereon. In order that the ring-body may come to equilibrium at a definite angular displacement for a specific pressure differential, it is necessary to oppose the rotation of the ring-body with a torque counter to that exerted by said pressure differential. By the term "loading" as used throughout this specification and the appended claims, I mean the application of force to a rotatable member such as the torus of a ring-balance in order to establish the counter-torque necessary for said equilibrium.

For convenience in the application of the loading means to the rigid link I prefer to interpose a tappet or the like between said link and said loading means, in which case said rigid link appropriately may be termed a connecting rod. Thus, as used throughout this specification and the appended claims, the term "connecting rod" means any rigid linkage or mechanism converting the rotary motion of a rotatable torus or other member exhibiting a variable undergoing measurement, into a substantial rectilinear translation and applying the latter motion to the tappet or the like. The eccentric end of the connecting rod is fixed with respect to a point following the rotation of the torus; advantageously, said end may be pivotably attached directly to the torus. The reciprocating end of the rod is connected to the tappet at a point other than the center of rotation of the torus. Accordingly, the arcuate travel of the rotatable end of the connecting rod will cause stroking of the tappet. The connecting rod is preferably maintained in a plane perpendicular to the axis of rotation of the torus so that the loading force will not tend to tilt the torus with respect to its axis of rotation.

Now, if a force is applied to the tappet which resists the stroke of said tappet when the torus is deflected from its null position, a component of this force will be transmitted through the connecting rod to the torus. At the foot of the connecting rod the transmitted component of force will be further resolved into components. The loading force which effectively opposes deflection of the torus from the null position at a given deflection thereof is the component of the force transmitted through the connecting rod which is tangent to the torus at the foot of said connecting rod. It follows that the magnitude of the force effectively opposing ring rotation is dependent upon two factors, (1) the force applied to the tappet and (2) the geometric position of the connecting rod relative to the torus. The angular displacement of the torus for any given head connected across said torus in turn is a function of the force effectively opposing rotation of the ring.

The control of a pressure-responsive element in precision instruments as taught by my invention has a wide field of industrial applicability. Measurement of rate of flow may be mentioned as one of these applications. Such measurement customarily is made by mechanism, as exemplified by a ring-balance, responsive to the differential pressure created by fluid flowing through an orifice plate or functionally equivalent primary element positioned in a conduit. The pressure differential reacts upon the ring-balance connected across the primary element to produce a deflection of the ring-body. The rate of fluid flow in the conduit is a square root function of the pressure differential indicated by the ring-body deflection.

Following the example further, in previous ring-balance instruments the square root of the pressure differential usually has been extracted mechanically by a cam in order that the pointer or pen of the instrument may indicate the rate of fluid flow directly upon a uniformly graduated scale or recording chart. The follower of such a cam must move along a lift contour equivalent to the curve of a square root function of the ring-body deflection. The curve designated as A in Figure 16 illustrates the path of the cam follower in extracting the square root of the ring-body deflection, i. e., the pressure differential, to indicate rate of fluid flow on a uniformly graduated scale.

A follower along the contour of curve A in Figure 16 has an initial starting point at dead center and requires lift of infinite slope at the initial point of deflection of the ring-body. Thus, the reason for a serious disadvantage in previous ring-balance instruments becomes apparent. Because of the mechanical disadvantage in extracting square root by cams of the above-described contour, previous ring-balance flow-measuring instruments necessarily have been sluggish and somewhat inaccurate in their lowest register readings. This defect is recognized generally in the trade, for conventional instruments are guaranteed to be accurate only for readings in the upper 80% of the instrument's register.

The inaccuracy of conventional ring-balance flowmeters in their lowest register readings is due to fixed loading, that is, to the use of constant mass counterweights rigidly connected to the torus, like the counterweight 60 in figure 13. My invention emancipates the ring-balance from the limitations of fixed loading, and for the first time makes it possible to provide ring-balance devices which respond to changes in the applied pressure according to almost any desired law of deflection of the torus. The relationship between the pressure applied and the deflection obtained depends both upon the type of loading means utilized and the geometrical configuration interrelating the torus, connecting rod, and loading means. For example, one embodiment of my invention is a ring-balance flowmeter wherein the connecting rod is aligned with a diameter of the torus and wherein a spring resists the stroke of the tappet when the torus is deflected from the null position. The deflection of the torus in this meter varies according to a function which is an approximation of the square root of the pressure differential across the meter. This approximation is corrected by a cam in the linkage between the pen arm and the torus. But the cam in this meter has a contour like that of curve B in Figure 16. It is evident that said curve does not have the inherent mechanical disadvantage of contour A. The slope of curve B is very small at the origin (or initial point of the cam) and said slope increases gradually as the cam contour develops, consequently permitting very sensitive indication by the instrument near the null position. The spring-loaded flowmeter embodiment of my invention may be guaranteed as reasonably accurate throughout fully 95% of its register as compared to the 80% customarily accepted as the limit of accuracy in the prior art devices.

The control of ring deflection achieved by my invention may also be utilized to secure greater accuracy in ring-balance flowmeters of the type wherein the motion of the torus is transmitted directly to the indicating member, so that said member follows the same law of deflection as the ring-body. The position of the indicating member then measures the flow upon a scale graduated according to a square root function. A conventional ring-balance flowmeter having a direct connection between the torus and the indicating means utilizes a chart graduated as shown at 58a in Figure 13, with the graduation lines crowded together in the lower range of values. My invention, on the other hand, makes it possible to magnify the ring deflection and associated travel of the indicating means produced by small rates of flow, and, if desired, simultaneously to scale down the deflections coresponding to rates of flow approaching the maximum capacity of the instrument, so that the instrument chart may be graduated as shown at 58b in Figure 14, with open graduations in the lower range of the instrument. This is accomplished by loading the torus with a force which increases more or less geometrically as the ring deflection increases. Such a loading is achieved in one embodiment of my invention by resisting the stroke of the tappet with a spring. Such a flow meter may be read accurately throughout the full range of the instrument. From this example, it is apparent that my invention may be constructed to magnify the pen travel in any desired portion of the instrument's range, in order to obtain greater accuracy in that range. This is accomplished by applying a loading force of proper function to the piston of the device. Another disadvantage of previous ring-balance instruments has been that the maximum range thereof was fixed by the mass of the counterweight, and could be varied only by removal of this counterweight, substituting another of different mass and recalibrating the instrument. In my improved ring-balances however, this adjustment of maximum range may be made with a minimum of effort, as for example, by the simple translation of a slidable block to vary the effective length of a cantilever spring or to change the length of the moment arm of a weighted lever. Furthermore, since the counterweight is a gravity device, conventional ring-balances are inaccurate unless the ways are maintained strictly level. Such instruments therefore cannot be used upon a pitching platform, such as a ship. My improved ring-balances, on the other hand, operate satisfactorily under such rigorous conditions. Furthermore, they are much less affected by jar and vibration, since my loading means tend to hold the knife-edge and ways together, in contradistinction to conventional ring-balances, where the knife edge and ways are paired only by the force of gravity acting upon the torus and counterweight, so that any upward tremor imparted to the torus tends to separate the knife-edge from the way, damage both, and cause the pen to jiggle and thus record erratically.

In order that the capabilities of my invention be completely understood and my invention be more fully disclosed, reference is had to the accompanying drawings which illustrate various forms of mechanism embodying the foregoing and such other capabilities, principles or advantages as may be pointed out as this description proceeds, or as are inherent in the present invention. For the purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 2 is a view in vertical section taken upon the line 2—2 of Figure 1;

Figure 4 is a kinematic diagram of one form of mechanism for the application of a variable loading force to a ring-body;

Figure 5 is a kinematic diagram of a loading mechanism utilizing a lever;

Figure 6 is a detail view taken partially in vertical central section, of mechanism utilizing the kinematic arrangement shown in Figure 5;

Figure 7 is a detail view, taken partially in vertical central section, of a variable lever modification of the mechanism depicted in Figure 6;

Figure 8 is a kinematic diagram of loading mechanism utilizing a pendant weight;

Figure 9 is a detail view, taken partially in vertical central section, of mechanism utilizing the kinematic arrangement shown in Figure 8;

Figure 10 is a kinematic diagram of a form of mechanism for the application of a constant loading force to a ring-body;

Figure 11 is a detail view, taken partially in vertical central section, of mechanism utilizing the kinematic arrangement shown in Figure 10;

Figure 14 is a kinematic diagram of a spring-loaded embodiment of my invention having its indicator connected directly to the torus, and emphasizes the open scale graduations in the lower range of the instrument;

Figure 15 is detail elevational view in enlarged scale of a portion of the torus, cam, pen arm, and chart of the flowmeter shown in Figure 1, and illustrates the linkage between said parts, as well as the uniform graduation of the chart;

Figure 16 is a chart plotting the relationship between the rate of flow indicated by various forms of flowmeters and the angular deflections thereof;

Figure 1:
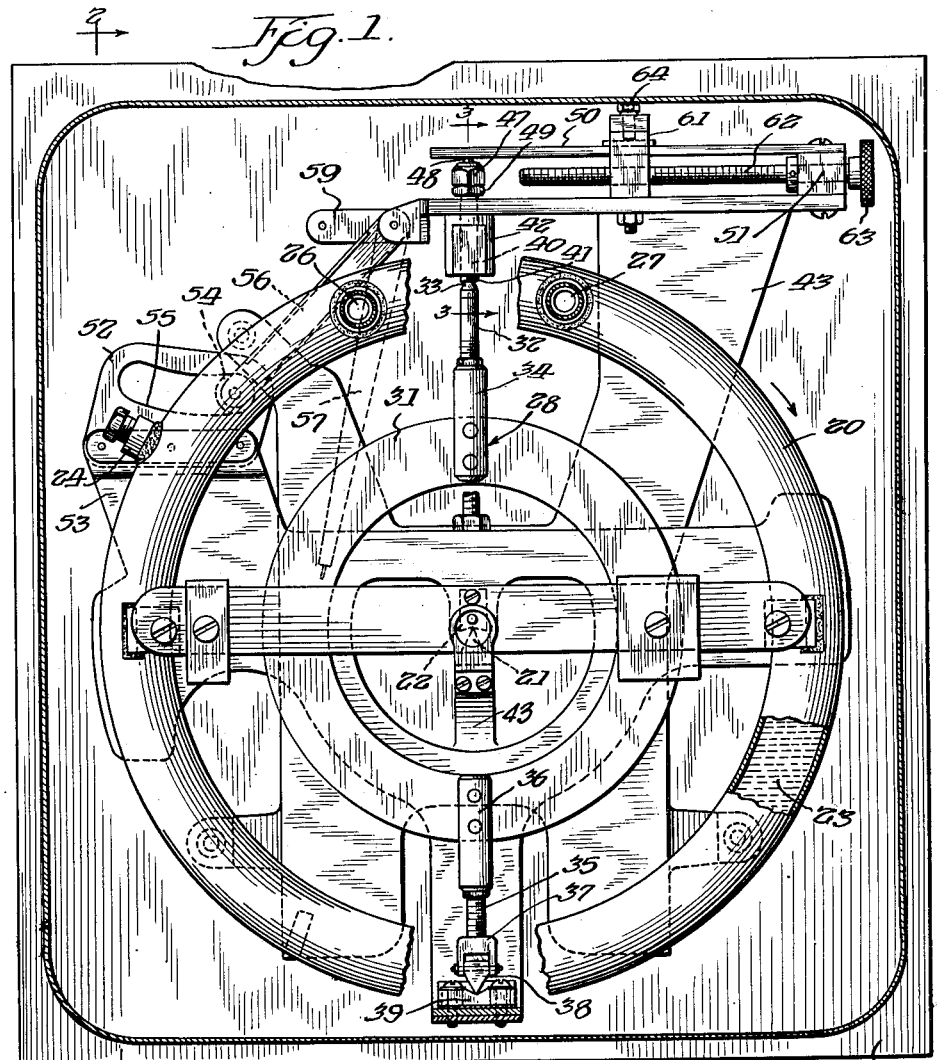
Figure 1 is a rear elevational view of a ring-balance meter incorporating a preferred embodiment of my invention, the back plate of the meter housing being removed and portions of the torus being broken away to illustrate more completely the arrangement and cooperation of parts.
Figure 18:
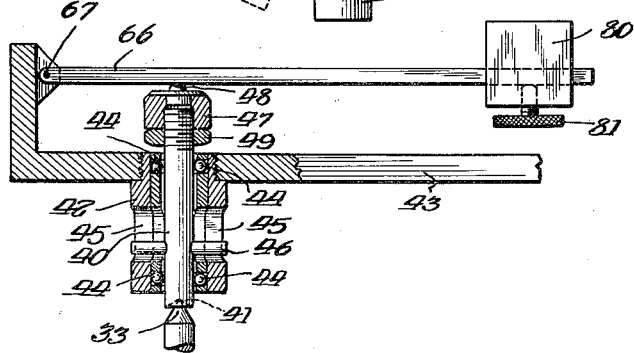

Figure 17 is a schematic representation of two cam contours which make it possible to use uniformly graduated flowmeter charts, contour A being used in conventional flowmeters and contour B being employed in a spring loaded embodiment of my invention; and Figure 18 is a diagram resolving the loading force utilized in the spring loaded instrument of Figure 1, with some parts of the instrument kinematically represented.

Like reference characters are used to designate similar parts in the drawings and in the description of invention which follows:

Referring now more particularly to the drawings, Figures 1 and 2 illustrate a ring-balance flowmeter incorporating a preferred embodiment of my invention. The meter is encased in the housing 19 and is shown as including a conventional ring-body (torus) 20 provided with an axle 22 at the center thereof. The knife edge 21 carried by the horizontally projecting portion of the frame member 43 (Figure 2) acts as the fulcrum for the axle 22, and hence the torus 20. Sealing fluid 23 inserted through the filling plug 24 and a partition 25 (Figure 2) divide said torus into two compartments which communicate respectively with the pressure inlets 26 and 27. By connecting said inlets 26 and 27 on opposite sides of a primary element, such as an orifice plate or Venturi tube, inserted in a conduit, the pressure differential across the primary element created by flow of fluid through the conduit will cause the torus 20 to rotate.

Rotation of the torus 20 is opposed by a loading force to bring said torus to equilibrium at a specific angular displacement thereof for each measure of pressure differential imposed thereon. This loading force is transmitted to the torus 20 through a connecting rod assembly 28. The operation of the connecting rod assembly 28 is best perceived in the figures of the drawing wherein said assembly is depicted kinematically and free from mechanical detail. Reference is made to Figure 14 for this purpose.

The connecting rod assembly 28 is constrained at one end 29 to follow a point on the torus 20 as said torus rotates. The other end 30 of said assembly 28 is constrained to reciprocating motion only. It is apparent that the arcuate travel of the end 29 will cause translation of the end 30 regardless of the position or length of the assembly 28, except when the end 30 coincides with the axis of rotation of the torus 20. Now, if translation of the end 30 is resisted by a force applied to said end 30, a component of this force will be transmitted through the assembly 28, and a further component of the transmitted force tangent to the ring at the end 29 will constitute the force effectively opposing ring rotation.

Although my invention embraces all positions and all effective lengths of the connecting rod assembly 28 respective to the torus 20 with the single exception mentioned above, I prefer that said assembly 28 be positioned vertically (as shown in Figure 14) when the torus 20 is in the null position. With such an arrangement the application of a loading force seats the way 22 more firmly upon the knife edge 21. Thus, the torus 20 is damped against vertical vibration and the instrument is less susceptible to jar than previous gravity-loaded ring-balances.

Referring now again to Figures 1 and 2 the connecting rod assembly 28 comprises two sections of shaft joined by a circular yoke 31 to circumvent the knife edge 21 and way 22. The upper shaft section 32 terminates at one end in the conical pivot 33 and at the other end in a threaded, forked sleeve 34. The sleeve 34 straddles the yoke 31 which is riveted in the fork of said sleeve. The threaded engagement between the shaft section 32 and the sleeve 34 permits the vertical adjustment of the conical pivot 33. The lower shaft section 35 similarly is joined to the yoke 31 by a second threaded, forked sleeve 36. A forked collar 37 is threaded upon the lower terminus of the shaft section 35. Pinned between the prongs of this collar 37 is a knife edge 38. The knife edge 38 bears upon the way 39 rigidly fastened to the torus 20. The threaded engagement between the shaft section 35 and the sleeve 36 permits adjustment of the distance between the yoke 31 and the way 39.

For convenience in the application of a loading force, a tappet 40 (best shown in Figure 3) is provided at the reciprocating end of the connecting rod assembly 28. The base of the tappet 40 is conically recessed to furnish a way 41 for reception of the conical pivot 33. A cylindrically-bored block 42 threaded into an arm of a frame member 43 journals the tappet 40 between ball bearings 44. Vertical slots 45 in the collar 42 carry a pin 46 which pierces the tappet 40. The constraint of the slots 45 upon the pin 46 prevents the tappet 40 from rotating about its longitudinal axis but permits reciprocation of said piston vertically along said axis.

A nut 47 is threaded upon the upper end of the tappet 40 and a spherical bearing 48 carried upon the top surface of said nut forms a contact to the loading means hereinafter described. The threaded engagement between the nut 47 and the tappet 40 permits fine adjustment of said contact. A lock nut 49 is provided below the nut 47 to safety the latter after this adjustment has been made.

The bearing 48 makes contact with a cantilever spring 50 which generates the loading force transmitted to the torus 20 through the tappet 40 and connecting rod assembly 28. The spring 50 is supported by and fixed at the end remote from the bearing 48 to the bracket 51 fastened to the frame member 43. The bracket 51 is adapted to removal from the frame casting 43 when it is desired to change the type of loading imposed upon the instrument.

Figure 3:
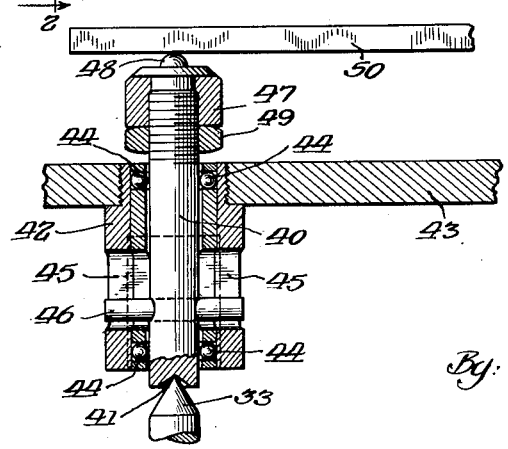
Figure 3 is a detail view of the tappet and related parts, taken partially in vertical section upon the line 3—3 of Figure 1.

At the null position of the torus 20, the spring 50 rests very lightly upon the bearing 48 (Figure 3). In the event that the spring 50 deviates from Hook's law during the initial portion of its deflection, this source of inaccuracy may be effectively circumvented by placing the spring 50 under an initial load, counterbalanced by an appropriate counterweight. When the torus 20 is forced to rotate, the way 39 will be carried along the arc of the ring-body's deflection. The knife edge 38 will be deflected similarly, thus lifting, as well as angularly displacing, the connecting rod assembly 28. The connecting rod assembly 28 will push the tappet 40 against the spring 50 and deflect said spring. The tension of the spring 50 will react through the tappet 40 and connecting rod assembly 28 to oppose the ring deflection.

Although, for reasons stated above, I prefer to position the connecting rod assembly 28 parallel to the vertical diameter of the torus 20, such positioning is not essential to the operation of the instrument under description. The connecting rod assembly 28 may be horizontally applied to the torus 20 or it may be inclined at any angle to the horizontal. Furthermore, since the reaction of the spring 50 is independent of gravity, this instrument need not be levelled before use and thus is adaptable to applications upon inclined or pitching platforms.

However, the principal advantage of this embodiment of my invention derives from the law of deflection imposed upon the ring-body. The deflection of the ring-body depends upon the magnitude of the force urging the ring in rotation in relation to the force effectively opposing said rotation. The nature of the force urging the ring in rotation is understood as the pressure differential applied across said ring. The nature of the opposing force may be derived from an examination of the force diagram of Figure 18. In Figure 18, the point C represents the center of rotation of the torus 20, and the arc IE represents the body of said torus. The line BE delineates the connecting rod assembly 28 when the torus 20 is at rest, and the line AF depicts said connecting rod assembly when said torus is deflected through the angle $\theta$. The line JK represents the spring 50 when the torus 20 is at rest and the arc LK depicts the spring 50 when said torus is deflected through the angle $\theta$.

The force exerted by the spring 50 will be transmitted to the torus 20 through the connecting rod assembly 28, and the component of said force which effectively opposes ring rotation will always be tangent to the ring at the foot of the connecting rod.

Let the vector HF represent the said effective component of the loading force. Construct the vector AG parallel and equal to HF.

(1) $AG \propto \sin \alpha$
(2) $\therefore HF \propto \sin \alpha$
(3) $\alpha + \beta + \gamma = 180°$
(4) $\theta + \gamma = 180°$
(5) $\therefore \alpha = \theta - \beta$ and (6) $\therefore \sin \alpha = \sin (\theta - \beta)$
(7) $\therefore HF \propto \sin (\theta - \beta)$ Let $F$ = the force exerted by the spring 50, and $AB$ = the displacement of said spring when the ring has rotated through the angle $\theta$: then, according to Hook's law:

(8) $F = k(AB)$, where $k$ is Hook's constant, i. e. the characteristic of the spring 50.
(9) $AB = AD - BD$
(10) $AD = AF \cos \beta$
(11) $\therefore AB = AF \cos \beta - BD$
(12) $BD = BE - DE$
(13) $DE = CE - CD$
(14) $CD = CF \cos \theta$
(15) $\therefore DE = CE - CF \cos \theta$
(16) $\therefore BD = BE - (CE - CF \cos \theta)$
(17) $\therefore AB = AF \cos \beta - [BE - (CE - CF \cos \theta)]$,
(18) $AB = AF \cos \beta - [BE - CE + CF \cos \theta]$
(19) $AB = AF \cos \beta - BE + CE - CF \cos \theta$ Let $P$ = the length of the connecting rod assembly 28 and $R$ = the radius of the torus 20. Then substituting P and R in equation (19):

(20) $AB = P \cos \beta - P + R - R \cos \theta$
(21) $AB = P(\cos \beta - 1) + R(1 - \cos \theta)$
(22) $(1 - \cos \theta) = \text{versine } \theta$
(23) $(\cos \beta - 1) = -\text{versine } \beta$
(24) $AB = -P \text{ versine } \beta + \text{versine } \theta$
(25) $\therefore AB = R \text{ versine } \theta - P \text{ versine } \beta$ Since R and P are constants in any given instrument:

(26) $AB \propto$ (versine $\theta$ — versine $\beta$)

From equation (8):

(27) $F \propto (AB)$

From equation (7):

(28) $HF = F$ sine $(\theta - \beta)$
(29) $HF \propto AB$ sine $(\theta - \beta)$ Substituting for AB from equation (26):

(30) $HF \propto$ sine $(\theta - \beta) \cdot$ (versine $\theta$ — versine $\beta$)

Within the operating limits of the torus 20, the sine $(\theta - \beta)$ is substantially a linear function of ring deflection. Also within said operating limits, the difference (versine $\theta$ — versine $\beta$) is approximately proportional to the square of ring deflection. Consequently the loading force which effectively opposes ring rotation in this spring-loaded embodiment of my invention increases substantially as the square of ring deflection.

The result of a loading force which varies as the function (versine $\theta$ — versine $\beta$) upon ring deflection is that said deflection is approximately proportional to the square root of the pressure differential applied to the ring instead of being directly proportional to said pressure differential as is the case in a conventionally-loaded ring-balance. Since rate of flow is also a square root function of the applied pressure differential, it is apparent that ring deflection in my spring-loaded ring-balance is more nearly a direct measure of rate of flow than it is a measure of applied pressure differential.

Figure 16 graphically compares the relationship of rate of flow to ring deflection in my spring-loaded ring-balance to the same relationship as it exists in a conventional ring-balance. In Figure 16, ring deflection in percentage of the maximum deflection is plotted as the abscissa variable against flow in percentage of the maximum flow as the ordinate variable. Curve A represents the relationship for a conventional ring-balance when plotted on a uniform flow chart, and curve B the relationship for the spring-loaded ring-balance. In other words, assuming that 50% of the maximum rate of flow that may be measured by the instrument produces a given pressure differential across a given primary element, it may be read from curve A that said pressure differential resulting from said 50% flow produces 25% of maximum deflection in the torus of a conventionally loaded ring-balance. Similarly, reading on curve B, the same pressure differential causes 62% of maximum deflection in the torus of the spring-loaded ring-balance.

Curves A and B of Figure 16 are to be compared with curve C of the same figure. In most flow-meter applications, for ease and convenience in reading said meters, it is desirable to have flow indicated upon a uniformly graduated chart. This means, for example, that to indicate 30% of maximum flow the indicating pointer of the meter should be displaced 30% of its maximum travel, that to indicate 40% of maximum flow the pointer should be displaced 40% of its maximum travel, and so throughout the whole range of the instrument. Assuming now that the indicating pointer is connected to the torus so that said pointer follows the same law of deflection as said torus, we may substitute ring deflection for pointer travel in the above definition of uniform flow indication. Curve C of Figure 16 is a straight line illustrating this optimum relationship, i. e. indicated flow being always directly proportional to ring deflection.

As curve A of Figure 16 illustrates, the conventionally-loaded ring-balance is far from realizing a linear relationship between indicated flow and ring deflection. Because the loading force opposing ring rotation in my spring-loaded ring-balance varies approximately as the function (versine $\theta$ — versine $\beta$), this embodiment of my invention comes much closer to realizing said linear relationship. However, in both types of instrument, a cam may be interposed in the linkage between the torus and indicating pointer to attain pointer deflection strictly proportional to the rate of flow under measurement. In the conventional ring-balance such a cam mechanically extracts the square root of ring deflection, thus producing motion in the cam follower and indicating arm linked thereto equivalent to increments of flow. The cam contour required in the conventional ring-balance to obtain a linear relationship between indicator deflection and rate of flow will be substantially like curve A (see also Figure 17). It is apparent from Figure 17 that the cam follower riding upon cam A is in dead center position at the initial point of the cam and must rise sharply upon a curve of great slope immediately upon leaving said initial point. It has hereinbefore been pointed out that the inherent characteristics of such a cam are responsible for the sluggishness and inaccuracy of previous ring-balance instruments in the lowest 20% of their ranges.

Now, in the embodiments of my invention wherein the effective loading force varies as the function (versine $\theta$ — versine $\beta$), the cam contour required to obtain a linear relationship between indicator deflection and rate of flow will be substantially like curve B. A cam contour like that of curve B possesses none of the mechanical disadvantages inherent in curve A. Curve B rises with very small slope at the initial point and said slope increases gradually as the curve develops. The result of employing such a cam in an instrument embodying my invention is a marked increase of sensitivity and accuracy of said instrument particularly in the operating region where ring torque is minimum.

Referring now again to Figure 1, it may be seen that a cam 52, of a contour similar to that of cam B in Figure 17, is carried by the webbing 53 secured to the torus 20. The deflection of the torus 20 causes displacement of the cam 52. The motion of the cam 52 causes the cam follower 54 to ride up the cam contour 55. The cam follower 54 is connected through a linkage 56 to an indicating arm 57 which travels over the uniformly graduated chart 58 (best shown in Figure 15). The arm 59 which projects from the linkage 56 may be utilized to transmit the motion of the cam follower 54 to a valve (not shown), or other control means, if the instrument is to be used for control purposes, for example, as a liquid level regulator.

Figure 13:
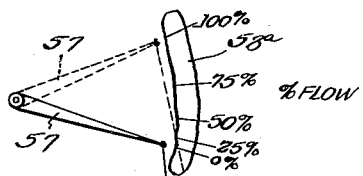
Figure 13 is a kinematic diagram of a conventional ring-balance flowmeter having its indicator connected directly to the torus, and utilizing the square root type of scale graduation.

A linear relationship between rate of flow and indicator deflection is frequently not specified in various flow applications. For example, it is sometimes preferred to use an open-scale chart 58a as shown in Figures 13 and 14, and to calibrate said chart in non-uniform flow graduations. In such case, no cam is employed in the linkage between the torus and the indicating arm, and the indicating arm follows the same law of deflection as the torus.

Figure 13 illustrates the calibration of an open-scale chart 58a on a square root scale to indicate flow units for a conventional ring-balance loaded with a counterweight 60. Figure 14 illustrates the calibration of an open-scale chart 58b for the same purpose when the ring-balance is spring-loaded through a tappet and connecting-rod as taught by my invention. It is apparent that it is impossible to read accurately the register of the conventional ring-balance below 25% of maximum flow because of the crowding of the graduations. The reason for this crowding may be perceived from curve A of Figure 16. Reading upon curve A, it will be noted that 10% of maximum flow produces only 1% of maximum ring deflection and that 20% of maximum flow causes only 4% of maximum ring deflection. Since the indicating arm follows the same law of deflection as the ring, it is apparent that very small increments of indicating arm travel in the lower portion of the register signify large increments of flow, thus necessitating the crowding of a great many flow graduations in a very small percentage of total indicating arm travel.

On the other hand, reading upon curve B of Figure 16 it will be noted that 10% of maximum flow causes 21% of maximum ring deflection and 20% of maximum flow produces 34% of maximum ring deflection. In effect, the above examples mean that ring rotation relative to rate of flow is greatly magnified in the lower region of the register of the spring-loaded embodiment of my invention. This magnification is evident in the chart 58b of Figure 14, which chart may be read accurately throughout the full range of the instrument. Furthermore, since the greater increments of flow occur in the lower part of the scale, this embodiment of my invention is particularly adaptable to applications wherein the instrument is regularly required to measure the flow of very slowly moving fluids. Still further, considering my invention in its broadest aspects, it may be perceived that the increments of flow may be magnified in any portion of the register simply by applying a variable loading force of proper function through my tappet and connecting rod to the torus.

The versatility of my invention in magnifying ring deflection in any portion of the instrument's register is a most important advantage, especially when utilized in control instruments. For example, it is frequently desired to stabilize the rate of fluid flow in a conduit at a pre-selected critical value. For this purpose, the deflection of a flowmeter to either side of a position representing said critical value is employed to regulate the opening of a valve in the fluid line. The principal disadvantage of previous instruments is that they respond too quickly to fluctuations in line pressure, i. e., are highly sensitive, thus causing the control instrument to overcompensate. This in turn necessitated further compensation, with the eventual result that the instrument constantly "hunted" the critical rate of flow. By the use of my invention to magnify ring deflection near the critical rate of flow, a highly desirable time lag may be introduced between deflection of the ring from the critical value and the actuation of the control valve, without sacrificing any of the instrument's accuracy and indeed even increasing the same. Thus, if the line pressure fluctuation is merely momentary, the flowmeter will return to the critical value before the control valve is actuated, thereby eliminating the "hunting" characteristic of previous instruments and greatly stabilizing the rate of flow in the line.

An object of my invention, previously stated, is to simplify the process of changing the maximum range of a ring-balance instrument. It is evident that the structure of any ring-balance limits the torus to a relatively small maximum angle of deflection. When the differential pressure applied to the ring is so great as to bring the torus against its upper limit of rotation, the maximum range of the instrument has been exceeded and the instrument is inoperative. However, if the loading force is also increased so that the torus deflection is decreased to fall again within the operating limits of rotation, the maximum range of the instrument has been increased and the instrument is again operative.

In previous ring-balances, this result was achieved by removing the counterweight attached to the torus and substituting a new counterweight of greater mass, or by affixing additional range-weights to the torus. In comparison therewith, the maximum range of the flowmeter under description may be changed by merely adjusting the effective length of the cantilever spring 50, thereby increasing or decreasing the resistance of said spring against deflection. In Figure 1, there is illustrated a block 61 slidably engaged upon the spring 50. The block 61 is pierced by a threaded shaft 62 rotatably journaled at one end in the bracket 51 and extending contiguous and parallel to the spring 50. A knurled knob 63 is keyed upon the end of the shaft 62. A turn of the knob 63 rotates the shaft 62 and translates the block 61 along the spring 50. A set screw 64 is provided in the block 61 to bear upon the spring 50, whereby the said block may be secured at the desired position along said spring. It is apparent that the spring 50 may be deflected only in the portion thereof extending beyond the edge of the block 61 nearest the bearing 48. Thus, the stiffness of the spring 50 may be increased by translating the block 61 towards the bearing 48, thereby increasing the force said spring will exert under tension. This follows from the relation $$AB = \frac{Fl^3}{3EI}$$

where AB is the deflection of the spring 50 at the point of contact with the tappet 40, F is the restoring force of the spring 50, l is the effective length of the spring, E is the modulus of elasticity and I is the moment of inertia. It therefore follows that a reduction of the length of the spring by one-half increases the maximum range of the instrument (proportional to F) by eight-fold. Therefore the maximum range of this spring-loaded ring-balance may be adjusted simply by a turn of the knob 63 without the substitution or addition of range-weights or any other parts.

Although the preferred form of my invention shown in Figure 1 utilizes a cantilever spring to accomplish a variable force loading of the instrument, it is understood that other arrangements equivalent to said cantilever spring may be also employed. In Figure 4, there is kinematically presented a ring-balance loaded by a helical spring 65. Figure 5 illustrates a slight modification of Figure 4 in that the helical spring 65 is fastened between a beam 66 and an extension of the frame member 43.

Figure 6 provides mechanical details amplifying the kinematic diagram of Figure 5. The beam 66 is pivoted at 67 in the frame member 43. The nut 41 is adjusted so that the beam 66 touches very lightly upon the bearing 48 when the torus 20 is in the null position. Rotation of the torus 20 will cause upward translation of the tappet 40, angular displacement of the beam 66, and extension of the spring 65. The extension of the spring 65 applies a loading force to the torus 20 which varies in accordance with Hook's law exactly as does the force applied by the spring 50 in the embodiment of Figure 1.

Figure 7 shows a mechanical arrangement similar to that of Figure 6 except that the beam 66 is adjustable in effective length. The beam 66 is held against lateral movement by the pin 69 constrained to move along the arcuate slot 68, the pin 69 being substantially smaller in diameter than the width of said slot 68. A knife edge 70 at the end of a threaded shaft 71 bears upon the top surface of the beam 66. The shaft 71 is positioned parallel to the beam 66 and is threadably engaged in the frame casting 43. A knurled knob 72 is provided at the end of the shaft 71. A turn of the knob 72 rotates the shaft 71 and translates the knife-edge 70 along the beam 66, in effect providing said beam with an adjustable fulcrum. Because of the clearance between the pin 69 and the edges of the slot 68, the fulcrum point of the beam 66 may be varied without introducing any binding between the pin 69 and the slot 68 as the beam 66 deflects. A change in the effective length of the beam 52 varies the moment arm of the force applied by the spring 65 and also varies the tension imposed upon said spring by a given increment of ring deflection. Consequently, the magnitude of the loading force is directly affected by the position of the knife-edge 70. Thus, a turn of the knob 72 serves to change the range of this instrument as simply and as effectively as does a change in the effective length of the leaf spring 50 in the embodiment of Figure 1.

Figures 8 and 9 illustrate kinematically and in mechanical detail respectively the application of a variable force loading without the use of a spring. Here the bearing 48 is in contact with a horizontal lever 73. The lever 73 is rigidly connected to a ring 74. The ring 74 is supported by a way 75 resting upon a knife-edge 76 fixed to the frame casting 43. A threaded shaft 77 projects from the nether portion of the ring 74 and a weight 78 is screwed upon this shaft. As the ring-body rotates, the lever 73 will be borne upwards by the bearing 48. The vertical movement of the free end of the lever 73 will cause rotation of the ring 74 and consequently the weight-carrying shaft 77 will be angularly displaced from its vertical position. Gravity, acting upon the weight 78, will exert a force tending to restore the shaft 77 to its former vertical position. This force of gravity will be transmitted through the lever 73, the tappet 40, and the connecting rod 28 to the ring-body 20. This transmitted force is equal to the mass of the weight 78 times the sine of the angle $\phi$ depicted in Figure 8

$$(F = M \sin \phi)$$

Within the limits of operation of the instrument, $\phi$ is always a small angle. Since the sine function of small angles is substantially linear, the force transmitted to the tappet 40 is a variable of constant rate of change just as is the force generated by a spring in accordance with Hook's law. Thus, a ring-balance loaded by a weighted bell-crank arrangement as shown in Figures 8 and 9 will follow substantially the same law of deflection as will the spring-loaded instruments previously described.

Figure 12:
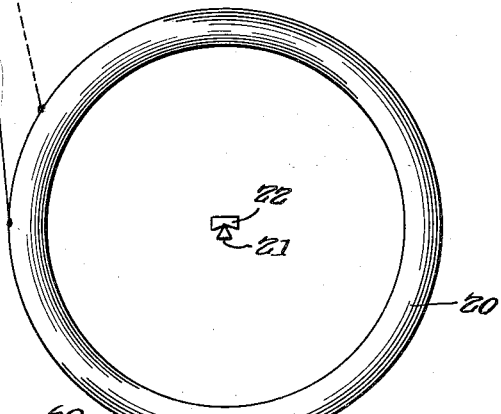
Figure 12 is a detail view, taken partially in vertical central section, of loading mechanism utilizing a weight slidable along a lever arm.

Although this description has so far placed considerable emphasis upon the advantages of variable force loading, it is undesrtood that my invention is adapted to constant force loading equally as well. Thus, I may fasten a range-weight 79 directly upon the tappet 40 as shown in the diagram of Figure 10 and in the mechanical detail of Figure 11. Figure 12 illustrates how the effect of a similar weight 80 may be multiplied by placing said weight at the end of a moment arm, exemplified by the beam 66. The length of the moment arm may be changed by fitting the weight 80 to slide upon the beam 66, thereby providing simple and effective means for adjusting the maximum range of the instrument. A set screw 81 serves to secure the position of said weight along said beam.

The ring of a constant force loaded embodiment of my invention, as depicted in Figure 12, follows the same law of deflection as the torus of a conventional ring-balance (see Figure 13). Thus if the spring JK of Figure 18 is replaced by a weight $W_1$, then the force exerted upon the tappet 40 may be expressed as $$F = W_1$$

Since from equation (28) of column 9

$$HF = F \sin (\theta - \beta)$$

where HF is the tangential force opposing rotation of the torus, it follows that $$HF = W_1 \sin (\theta - \beta)$$

As previously indicated, within the normal operating limits of the torus 20, the function sine $(\theta - \beta)$ is substantially linear. On the other hand, if the loading is effected by a weight $W_2$ affixed to the torus 20 (for example, the weight 60 of Figure 13), then, upon rotation of said torus through an angle $\theta$, a tangential component equal to $W_2$ sine $\theta$ opposes further rotation. This function, too, is substantially linear within the operating limits of the torus. Actually, however, the weight loading imposed on the torus 20 using the arrangement of Figure 11 or 12 more nearly approaches a linear function than does the conventional weight loading of Figure 13.

Thus, I can easily adapt my invention to operate like a conventional ring balance, and to use the same recording charts, wherever this is deemed desirable as, for example, when it is preferable to magnify indicating arm travel in the uppermost portion of the register. My invention, however, still maintains inherent advantages over the instruments of the prior art. Instruments embodying my invention may be used where they are subject to jar and vibration since the application of the loading force through a vertical connecting rod acts to maintain the knife edge and way at the center of rotation in constant contact. The adjustment of maximum range by merely shifting the weight 80 along the beam 66 is a considerable improvement over the prior art method of substituting or adding range-weights.

The great advantage of my invention, however, is its versatility. By the application of a proper loading force through my load-transmitting subassembly, the pressure-responsive element may be constrained to follow the law of deflection most suited to the application of the instrument. Should the conditions of use of the instrument change, the type of loading also may be changed and the instrument thereby may be best adapted to its new application. For example, to modify my invention from variable force loading to constant force loading, it is only necessary to remove the spring-supporting bracket 51 (Figure 1) the nuts 47 and 49, and to screw the weight 79 (Figure 11) upon the tappet 40. The reverse process is, of course, equally simple.

From the foregoing, it is apparent that I have invented novel pressure-responsive precision instruments which possess numerous advantages hereinbefore specified over instruments for similar purposes previously known and used. While I have described my invention as embodied in specific forms and as operating in specific manners for the purposes of illustration, it should be understood that I do not limit my invention thereto, since various modifications no doubt will suggest themselves to those skilled in the art without departing from the spirit of my invention, the scope of which is set forth in the annexed claims.

I claim:

1. In measuring apparatus including an element rotatably responsive to variations in the magnitude of a variable under measurement, the combination with said element of loading means comprising: a rigid member substantially radially disposed with respect to said element when said apparatus is in the null position, means spaced from the axis of rotation of said element compelling a portion of said member to follow the rotation of said element, means for constraining to substantially linear translation another portion of said member spaced from said first portion, and means resisting said translation of said other portion as said element rotates.

2. In measuring apparatus including an element rotatable about its axis of rotation in response to variations in a variable under measurement, the combination with said element of loading means comprising: means yieldably resisting deflection, a member pivotally connected to said element eccentric of said axis to receive motion from said element, said member being drivably engaged with said resisting means at a point spaced from said axis, said member being substantially radially disposed with respect to said axis when said measuring apparatus is in the null position, and means constraining said member to substantially linear displacement at said point of engagement with said resisting means, whereby said member transmits the angular displacement of said element into a linear displacement at said resisting means.

3. The combination, in measuring apparatus including a rotatable element responsive to variation in a variable under measurement, and means resisting deflection to operatively coact with said element to bring said apparatus to a different equilibrium position for each different value of said variable, of other means operatively interconnecting said means and said element, said other means comprising: a link extending across and radially of said element when said apparatus is in the null position, means compelling a first portion of said link to follow the rotational motion of said element, and other means spaced from the axis of rotation of said element constraining a second portion of said link spaced from said first portion, to substantially linear displacement radially of said element.

4. In measuring apparatus including an element rotatable in response to variations in a variable under measurement, means for transmitting a loading force to said element comprising: a pair of links and a yoke rigidly interconnecting said links, said links being positioned across and radially of the axis of rotation of said element when said apparatus is in the null position, said yoke circumventing said center of rotation of said element; means compelling the outer end of one of said links to follow the rotation of said element; means constraining the outer end of the other of said links to substantially linear motion; and loading means acting on said outer end of said other link.

5. In a ring-balance including a rotatable torus, means for transmitting a loading force to said torus, comprising: a knife-edge bearing way projecting from said torus at the foot of the vertical diameter thereof when said torus is in the null position; a knife-edge paired with said way; a first shaft projecting from said knife edge towards the center of rotation of said torus; a yoke at the end of said first shaft to circumvent said center of rotation; a second shaft projecting from said yoke opposite said first shaft and aligned therewith, said shafts and said yoke comprising a rigid linkage; loading means; a tappet at the end of said second shaft contacting said loading means; and means constraining said tappet to vertical reciprocation.

6. A ring-balance device comprising: a rotatably mounted, hollow torus partially filled with liquid and partitioned into two compartments adapted to communicate with separate sources of pressure; indicating means positioned by the deflection of said torus; a knife-edge bearing way at the bottom of said torus when said torus is in the null position; a connecting rod, terminating at one end in a knife edge paired with said way and projecting upwardly therefrom to a point other than the center of rotation of said torus; a member, constrained to linear reciprocation, at the other end of said connecting rod, whereby rotation of said torus displaces said member; and means for resisting the upward stroke of said member, thereby applying a loading force through said connecting rod to said torus, which loading force opposes the angular displacement of said torus from its null position.

7. In a differential pressure measuring device including a rotatable torus, means for realizing large increments of torus deflection per unit of applied pressure differential near the null position, whereby said increments progressively decrease in size with greater torus displacement, said means comprising: a connecting rod of length other than the radius of said torus, said connecting rod intersecting the axis of rotation of said torus when in the null position, means pivotally connecting one end of said rod to said torus; means constraining the other end of said connecting rod to reciprocating motion; spring means resisting the movement of said reciprocating end; means exhibiting the deflection of said torus; and a chart co-acting with said exhibiting means, said chart being calibrated in the lower portion of its scale in graduations of large increments which progressively decrease across said scale, whereby said meter may be read most accurately in the portion of its range wherein the actuating ring torques are the smallest.

8. In measuring apparatus including an element rotatably responsive to variations in a variable under measurement, the combination with said element of loading means comprising: a rigid member positioned substantially radially of said element when said apparatus is in the null position, means compelling a portion of said member to follow the rotation of said element, means spaced from the axis of rotation of said element for constraining to substantially linear translation another portion of said member spaced from said first portion, and means for imposing on said other portion a resisting force which varies in substantially direct proportion to the translation of said other portion.

9. Mechanism for loading the torus of a ring-balance, comprising: a rigid link extending across and substantially radially of said torus when said ring-balance is in the null position, means pivotally connecting one end of said link to said torus to follow the curvilinear movement thereof, means spaced from the axis of rotation of said torus constraining the other end of said link to substantially straight line motion substantially radially of said torus, and means for imposing on said other end a resisting force which varies in substantially direct proportion to the translation of said other end.

10. A measuring instrument comprising: a rotatable member responsive to pressure variations reflecting the magnitude of a variable under measurement; means indicating the deflection of said member; a connecting rod intersecting and extending across the axis of rotation of said member when said instrument is in the null position, means pivotally connecting said connecting rod at one end thereof to said member, at a point eccentric of the center of said member; a second member constrained to substantially reciprocal movement, said second member actuated by the other end of said connecting rod upon rotation of said rotatable member; and spring means resisting deflection of said second member, whereby rotation of said rotatable member is opposed.

11. In measuring apparatus including a driven rotative element, the combination with said element of loading means comprising: a rigid link positioned substantially radially of said element when said apparatus is in the null position, means pivotally connecting a portion of said link to said element, means spaced from the axis of rotation of said element constraining another portion of said link to straight-line motion, and loading means actuated by that portion of said link exhibiting said straight-line motion, said loading means including a deflectable weighted member.

12. Mechanism for loading the torus of a ring-balance, comprising a rigid link extending radially of the axis of rotation of said torus when said ring-balance is in the null position, connecting means causing one end of said link to rotate with said torus, means spaced from said axis of rotation of said torus constraining the other end of said link to substantially straight-line motion, and loading means actuated by said other end of said rigid link including a weighted, deflectable member.

13. In combination with a rotatable torus of a ring-balance, means for transmitting a loading force to said torus, comprising: a rigid link aligned diametrically with said torus when said ring-balance is in the null position, means compelling one end of said link to follow the rotation of said torus, means constraining the other end of said link to linear motion, a tappet drivably connected to said other end of said link, means constraining said tappet to move substantially radially of the axis of rotation of said torus, and a weighted member acting on said tappet to resist deflection of said link and said torus.

14. In a measuring device including a rotatable member and means for exerting torque on said member in accordance with the magnitude of a variable under measurement, other means for loading said member, comprising: a link positioned radially of the axis of rotation of said member when said measuring device is in the null position, means compelling a portion of said link to follow the rotative motion of said member, other means spaced from said axis of rotation constraining a second portion of said link to substantially linear motion, a lever angularly displaced by said linear motion of said other portion, and means resisting deflection, said means operatively connected to said second portion of said link through said lever, whereby rotation of said member is opposed by said means resisting deflection.

15. Apparatus of the type defined in claim 2, wherein said constraining means for said member comprises a fixed guide element and a tappet slidably paired with said guide element and pivotally paired with said member; and wherein said resisting means comprises a cantilever spring intersecting the line of action of said tappet to resist the stroke thereof.

16. In apparatus of the type defined in claim 15, means for varying the effective length of said spring, thereby providing adjustment of the maximum operating range of said apparatus.

17. Apparatus of the type described in claim 16, wherein said means for varying the effective length of said spring comprises: a fixed frame member to which said cantilever spring is attached, a block slidably secured to said frame member and including means for adjustably clamping on to said spring, and means for adjustably positioning said block relative to said frame member and said spring, whereby the effective length of said spring is that portion which extends free from said block.

18. Apparatus of the type defined in claim 2, wherein said constraining means for said member comprises a fixed guide element and a tappet slidably paired with said guide element and pivotally paired with said member; and wherein said resisting means comprises a lever intersecting the line of action of said tappet and spring means operatively connected to said lever to resist deflection thereof.

19. Apparatus of the type defined in claim 1, wherein said constraining means comprises a fixed guide sleeve and a tappet slidable in said sleeve, said tappet pivotally paired with said other portion of said member; and wherein said resisting means comprises a lever positioned to be angularly displaced by said tappet, a spring one end of which is secured to said lever, and means fixing the other end of said spring.

20. In apparatus of the type defined in claim 19, a fulcrum and means for adjusting the position of said fulcrum relative to said lever to vary the ratio of moments about said fulcrum, whereby the magnitude of the force exerted upon said member for a given deflection of said tappet may be regulated.

21. Apparatus of the type defined in claim 2, wherein said constraining means for said member comprises a fixed guide element and a tappet slidably paired with said guide element and pivotally paired with said member; and wherein said resisting means comprises a pivoted bell crank having an unweighted arm and a weighted arm, said weighted arm being aligned substantially with the vertical when said torus is in the null position, said tappet operatively engaging said unweighted arm.

22. Apparatus of the type defined in claim 11, wherein said loading means comprises a bell crank including a first arm drivably connected with said other portion of said link, said bell crank further including a second arm aligned with said link when said measuring apparatus is in the null position, said second arm being threaded along a portion thereof, and a weight threaded onto said threaded portion of said second arm whereby the maximum operating range of said apparatus may be regulated.

23. Apparatus of the type defined in claim 2, wherein said resisting means comprises a pivoted link drivably connected to said member, and a weight adjustably positionable along the lever arm of said link.

24. Apparatus of the type defined in claim 11, wherein said constraining means comprise a fixed guide sleeve and a tappet slidable in said sleeve, said tappet pivotally paired with said other portion of said link; and wherein said loading means comprise a lever pivoted at one end thereof and positioned substantially perpendicular to the line of action of said tappet when said apparatus is in the null position, said tappet engaging said lever intermediate said pivoted end and the other end thereof, a weight slidable along said lever, and means for removably securing said weight to said lever, to vary the effective moment arm of said lever with respect to said pivoted end.

OTTO B. VETTER.

REFERENCES CITED

The following references are of record in the file of this patent:

UNITED STATES PATENTS

| Number | Name | Date |
|---|---|---|
| 1,225,866 | Schrears | May 15, 1917 |
| 1,303,595 | Rifflard | May 13, 1919 |
| 2,320,854 | Dethridge | June 1, 1943 |
| 2,331,153 | Ackley | Oct. 5, 1943 |
| 2,333,834 | Vetter | Nov. 9, 1943 |
| 2,428,436 | Sperry | Oct. 7, 1947 |

FOREIGN PATENTS

| Number | Country | Date |
|---|---|---|
| 374,039 | Great Britain | May 30, 1932 |
| 401,488 | France | July 24, 1909 |
| 404,558 | Germany | Oct. 20, 1924 |